July 21, 1953　　　H. L. BERKLEY　　　2,645,891
HYDRAULICALLY OPERATED POWER RAKE
Filed April 5, 1949　　　　　　　　　　　2 Sheets-Sheet 1

Inventor
Howard L. Berkley
By *Clarence A. O'Brien and Harvey B. Jacobson*
Attorneys

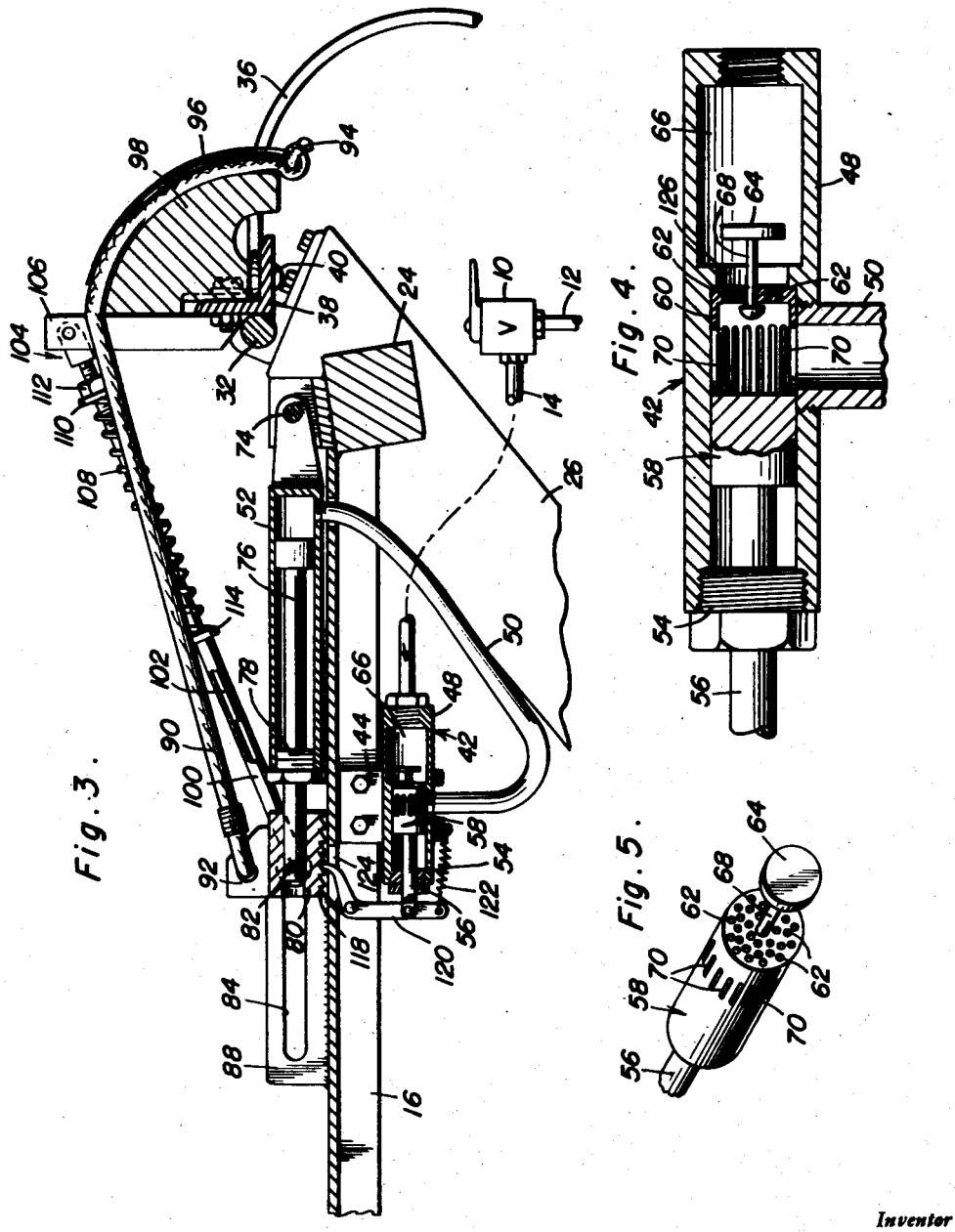

Patented July 21, 1953

2,645,891

UNITED STATES PATENT OFFICE 2,645,891

HYDRAULICALLY OPERATED POWER RAKE

Howard L. Berkley, Billings, Mont.

Application April 5, 1949, Serial No. 85,591

11 Claims. (Cl. 56—27)

This invention appertains to novel and useful improvements in farm implements.

More specifically, the invention relates to a farm implement of the rake type which is adjustable, the motive force being taken from the hydraulic system of a tractor whereby the tine assembly may be pivotally operated on a frame.

An object of this invention is to pivotally operate a tine assembly by means of the hydraulic system of a tractor, the fluid therefrom being introduced into a valve, which valve directs the fluid into a cylinder having a piston therein, the piston operating a crosshead which has a flexible connector attached thereto and to the tine assembly so that the tine assembly may be pivoted in response to a manipulation of a valve on a tractor.

Another object of this invention is to retain the tine assembly in the down position by means of a mechanism which is carried by the piston and frame but which is operated in response to movement of the core of the valve for releasing the locking assembly or mechanism whereby the tine assembly may be pivotally operated.

A feature of the present invention is the assembly or mechanism which is operated by the valve which conducts the fluid into the cylinder for ultimately pivoting the tine assembly and which includes a dog pivoted to the frame and a crosshead secured to the piston, the crosshead having a ratchet or ratchet members thereon engaged by the dog until fluid under pressure is introduced into the valve at which time the dog is released from the ratchet simultaneously with the introduction fluid into the cylinder, which introduction of fluid is reflected in pivotal movement of the tine assembly.

Another feature of the invention is the use of an extensible linkage carried at one end of the crosshead for movement therewith and secured at the other end to the tine assembly, a spring being interposed between members of the extensible linkage assembly positively pressing the tine assembly downward and into the hay or the like which is to be raked.

Ancillary objects and features of novelty such as simplicity of structure and facility in operation will become apparent to those skilled in the art, and following the description of the preferred form of the invention, illustrated in the accompanying drawings, wherein:

Figure 3 is a longtiudinal sectional view illustrating details of construction in enlarged scale with respect to Figure 1 and taken substantially on the line 3—3 of Figure 1 and in the direction of the arrows;

Fig. 4 is an enlarged central longitudinal sectional view of the valve used in conjunction with and forming a part of the invention, and Figure 5 is a perspective view of the valve core or plunger which is reciprocable in the valve case or housing.

Figure 1:
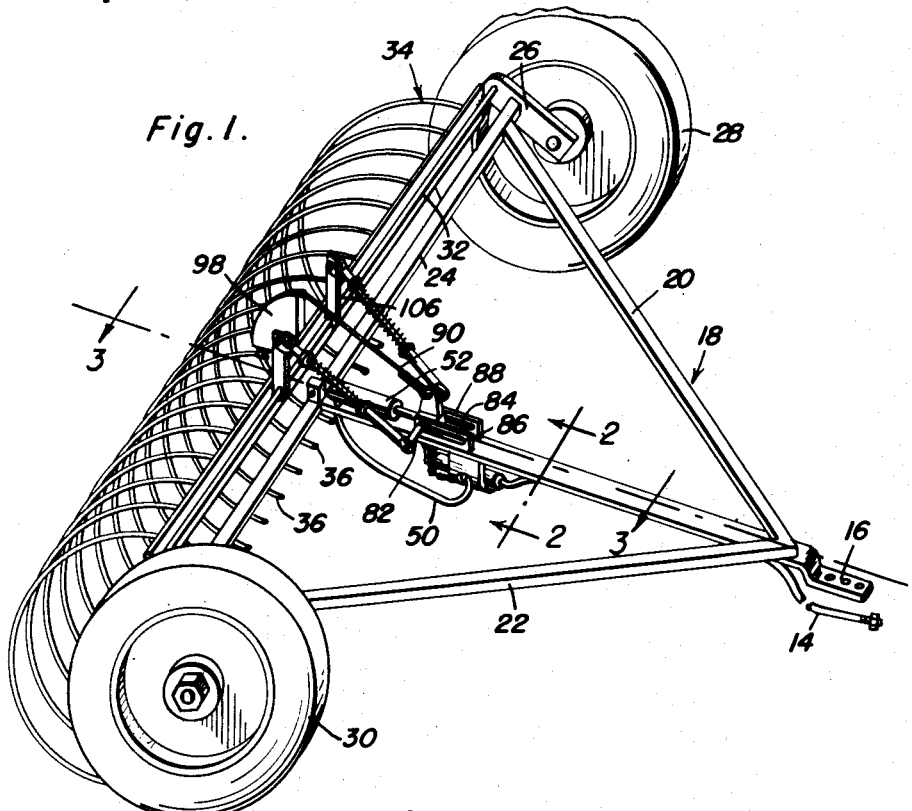
Figure 1 is a perspective view of the implement.
Figure 2:
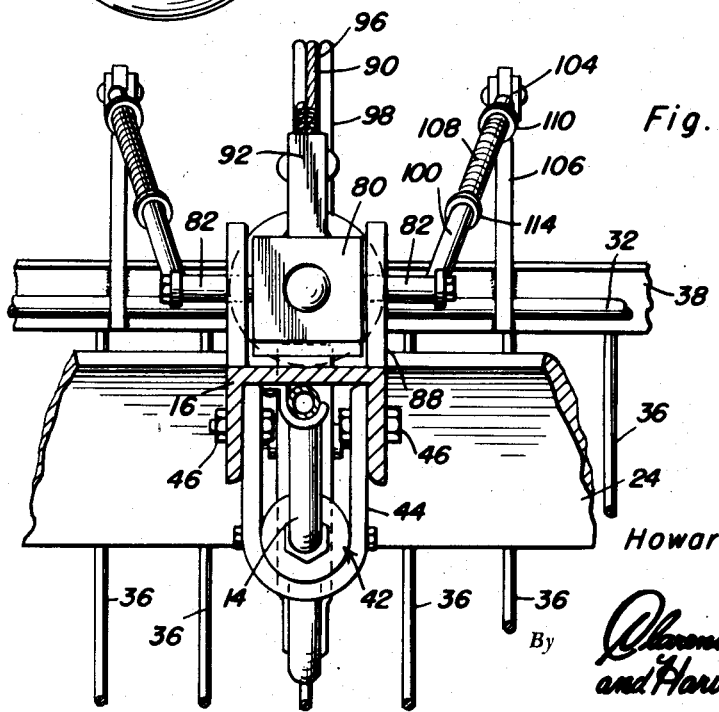
Figure 2 is a transverse sectional view illustrating details of construction in an enlarged scale and taken substantially on line 2—2 of Figure 1 and in the direction of the arrows.

Although the implement or attachment to be described is discussed in connection with a tractor, it is appreciated that any prime mover may be used in lieu of a tractor so long as there is a hydraulic pressure system thereon.

Numerous hay rakes have been used and there has been much experimentation with regard to this particular implement. There has been made the type of hay rake utilizing dead center positions of various links to retain it in the raised position and to retain it in the lowered position. There have also been hay rakes that operate on a partial hydraulic system. A very common type of hay rake is that which is fixed to the tractor and through the medium of substantially conventional linkage is raised and lowered in its entirety by means of tractor pistons and cylinders and there has also been the type which fixes directly to the tractor drawbar. My invention differs therefrom in that there is the utility of a comprehensive but simplified fluid flow system requiring only one simple connection with a fluid flow system of a tractor controlled by a conventional valve schematically illustrated at 10 in Figure 3. The inlet 12 is schematically shown and indicates that the valve receives fluid from a source on the tractor. The line 14 extends from the valve 10 which is of the three-way type, allowing fluid to flow outwardly through the valve, permitting no flow through the valve, and allowing fluid to return through the line 14. The connection of the line 14 with the valve 10 is the only one necessary for the complete operation of the rake insofar as motivating fluid is concerned. A mechanical connection through the medium of an apertured tongue 16 is provided between the frame generally indicated at 18 and a tractor drawbar or other suitable tractor element.

The frame 18 consists of a pair of converging sides 20 and 22 respectively which are fixed to the tongue 16 adjacent the apertured end thereof and which are fixed to a structural cross member 24 at the opposite ends thereof. Wheel supports 26 are fixed at the ends of the structural cross member 24 and have wheels 28 and 30 mounted for rotation thereon to the intermediate structures of conventional spindle assemblies. A pivot bar 32 is disposed in substantially parallel relationship with the structural cross member 24 and is secured at its ends to the supports 26. The tine assembly 34 is mounted for pivotal movement with the pivot bar 32.

The means for holding the tines 36 in place includes an angle 38 having the ends of the tines secured to one leg thereof by any suitable means such as screws 40. In permanent structures they may be spot welded, riveted or otherwise rigidly secured. They also may be detachable in nature as when the screws 40 are utilized.

Means for pivotally operating the tine assembly is supplied. A valve generally indicated at 42 is fixed to the frame and specifically to the tongue 16 by means of a substantially U-shaped clamp 44 having bolts 46 passing therethrough. This valve includes a housing or case 48 having an inlet for the line 14 and a port disposed in one wall thereof. This port has a conduit 50 which forms a passage for fluid, extending therefrom and terminating in a suitable opening provided in a cylinder 52. A closure 54 having a central opening is provided at one end of the case 42 and has the rod 56 of the plunger 58 passed therethrough. This plunger is actually a valve core (Figure 4) since it opens and closes a port having the conduit 50 attached thereto.

The specific structure of the core includes the rod 56 having a hollow piston head 60 attached at one end thereof with a number of apertures 62 provided in the face thereof. A check valve 64 is mounted for opening and closing the ports 62 in response to fluid pressure in the valve chamber 66, through the medium of a small stem 68. This stem is disposed in an opening formed in the said piston face.

A number of permanently open passageways 70 are provided in the hollow piston for conducting fluid from the valve chamber 66 into the conduit 50.

The said cylinder 52 is fixed by means of a pivot pin 74 to the frame and has a piston 76 mounted for sliding movement therein but passed through an opening in the end plug 78 of the said cylinder. A crosshead 80 is pivoted to the outer end of the piston rod and has guide pins 82 secured thereto. These guide pins are slidable in slots 84 and 86 which are formed in the guide 88. Accordingly, the crosshead is restricted in its travel to rectilinear movement in accordance with the movement of the piston 76.

Means mechanically connecting the crosshead with the tine assembly is provided. This means consists of a cable 90 or other flexible or rigid equivalent which is secured at one end to a plate 92 and secured at the opposite end to a stop 94. The stop 94 is disposed at the bottom of a trackway 96 formed in a guide shoe 98 fixed for movement with the angle 38. The plate 92 is in turn secured to the crosshead 80. Hence, upon movement of the piston 76 outwardly of the cylinder 52, the crosshead is slid toward the rear of the guide thereby pulling the flexible member 90 and pivotally operating the tine assembly.

In so moving the tine assembly, an extensible linkage mechanism is moved also. This linkage mechanism is extensible consisting preferably of a sleeve 100 which is fixed at one end to one of the guide pins 82. A rod 102 is slidably disposed in the bore of the sleeve and has a pivot connection 104 connected with a standard 106. The pivot connection is of a conventional description and is adjustable in nature.

A spring 108 is concentric with the rod 102 and reacts on a collar 110 which is backed by means of a nut 112 and which also reacts on a collar 114 which is disposed on the outer end of the sleeve 100. Accordingly, the spring constantly urges the rod 102 outwardly of the sleeve 100 thereby pressing the tines of the tine assembly downwardly. Since one end of the extensible linkage device is attached to the crosshead and the other end is attached to the tine assembly, when the crosshead is moved backward to raise the tine assembly by means of the flexible member 90, the linkage assembly is not extended or contracted but is moved therewith. The efficacy of the linkage assembly including the spring is realized at all times whether the tine assembly is in the full lowered, intermediate or full raised positions.

Means is carried in part by the crosshead and in part by the tongue 16 for releasably locking the tine assembly in a selected position. The locking takes place through the intermediate structure of the piston 76, crosshead 80 and extensible linkage structure described above.

A specific structure of this locking means includes a number of teeth forming a ratchet 118 on the lower surface of the crosshead 80. A dog 120 is pivoted to the tongue 16 and is in operative engagement with the ratchet 118. However, this dog is movable in response to movement of the valve core or plunger 58 since it is pivoted to the said rod 56. A spring 122 is attached at its ends to the valve case 48 and to the end of the dog 120 thereby opposing the operation of the dog and retaining the end thereof which passes through the slot 124 in the tongue 16 in operative engagement with the ratchet.

In operation liquid is introduced into the valve chamber 66 by manipulation of the valve 10. This first presses the check valve 64 against the ports 62 closing the same and thereby allows the fluid under pressure in the valve chamber 66 to push or urge the plunger away from the limiting abutment 126 formed in the chamber 66. By urging the plunger rearwardly in the case 48, the port having the conduit 50 connected therewith is opened allowing fluid to flow through the conduit and into the cylinder 52. This in turn urges the crosshead rearward in the guide 88 and pulls on the flexible member 90. This pulling is reflected in pivotal movement of the tine assembly 34 thereby raising the same when it is found desirable.

Simultaneous with this fluid flow there is the release of the ratchet and dog latching device. The rod 56 is moved rearwardly with the movement of the plunger 58 since it is connected therewith thereby pivotally operating the dog 120. This pivotal movement moves the dog from operative engagement with the ratchet, releasing the crosshead so that it may be operated by the fluid under pressure.

When the fluid is allowed to return from the system by manipulation of the tractor valve 10, the weight of the tine assembly pulls the crosshead forward thereby forcing the piston 76 inwardly of the cylinder 52. This in turn forces the check valve 64 open and pulls the plunger 58 inwardly of the case 42. Hence, the dog is pivoted into operative engagement with the ratchet 118.

Together with the movement of the crosshead 80 is the movement of the entire extensible linkage assembly. When the crosshead is in the latched position as shown in Figure 3, the rod 102 is free for movement inwardly and outwardly of the sleeve 100 against the compressive force of the spring 108. Accordingly the tine assembly is floatingly operated and pressed downwardly in response to normal operation of the hay rake through a field.

As disclosed in Figure 1 there are two identical extensible linkage assemblies supplied, one provided on each side of the cable guide shoe 98. By this construction in its duplicity the operation of these particular structures react on the pivot bar 32 in spaced places thereby affording a balanced actuation.

Having described the invention, what is claimed as new is:

1. A fluid actuated power means comprising a frame, a guide carried by said frame, a crosshead having ends slidably engaged with said guide and said crosshead having a ratchet thereon, a hydraulic inlet and outlet line adapted for connection with a tractor control valve, a dog pivoted to said frame operatively engaging said ratchet to retain said crosshead in selected positions, a valve carried by said frame and having said line connected therewith for operation of said valve, said valve including a case and a plunger, said dog being operatively connected with said plunger, a cylinder carried by said frame, a piston slidably engaging the cylinder, a single conduit extending from said cylinder to said case for conducting fluid from said valve to said cylinder, means connecting said piston with said crosshead for movement of said crosshead in response to movement of said piston, and means operatively connected to said crosshead and adapted to be connected to a tool holding angle pivoted on the frame for pivoting the angle about its pivot, and resilient means connected to the ends of the crosshead and reacting on said crosshead and adapted to react on an angle pivoted on the frame for constantly urging said angle pivotally about its pivot.

2. A fluid operated power means comprising a frame, a guide carried by said frame, a crosshead having ends slidably engaged with said guide and having a ratchet thereon, a hydraulic inlet and outlet line adapted for connection with a tractor control valve, a dog pivoted to said frame operatively engaging said ratchet to retain said crosshead in selected positions, a valve carried by said frame and having said line connected therewith for operation of said valve, said valve including a case and a plunger, said dog being operatively connected with said plunger, a cylinder carried by said frame, a piston slidably engaging the cylinder, a single conduit extending from said cylinder to said case for conducting fluid from said valve to said cylinder, means connecting said piston with said crosshead for movement of said crosshead in response to movement of said piston, a flexible member fixed at one end to said crosshead and means at the opposite end of said flexible member adapted for attachment to a tool holding angle pivoted on said frame whereby movement of said crosshead is transmitted to movement of said tool holding angle about its pivot.

3. A fluid actuated power means comprising a frame, a guide carried by said frame, a crosshead having ends slidably engaged with said guide and having a ratchet thereon, a hydraulic inlet and outlet line adapted for connection with a tractor control valve, a dog pivoted to said frame operatively engaging said ratchet to retain said crosshead in selected positions, a valve carried by said frame and having said line connected therewith for operation of said valve, said valve including a case and a plunger, said dog being operatively connected with said plunger, a cylinder carried by said frame, a piston slidably engaging the cylinder, a single conduit extending from said cylinder to said case for conducting fluid from said valve to said cylinder, means connecting said piston with said crosshead for movement of said crosshead in response to movement of said piston, a flexible member fixed at one end to said crosshead and means at the opposite end of said flexible member adapted for attachment to a tool holding angle pivoted on the frame whereby movement of said crosshead is transmitted to movement of said tool holding angle about its pivot, a pair of extensible members pivotally attached to the ends of the cross head and each having a spring operatively connected therewith adapted for pivotally urging a tool holding angle pivoted on the frame, means securing one end of each of said extensible members to said crosshead for movement therewith, and a pivotal connection adapted to connect the opposite ends of said extensible members pivoted on the frame to a tool holding angle.

4. A fluid actuated power means comprising a frame, a guide carried by said frame, a cross head disposed in said guide and having a ratchet thereon, a hydraulic inlet and outlet line adapted for connection with a tractor control valve, a dog pivoted to said frame operatively engaging said ratchet to retain said cross head in selected positions, a valve carried by said frame and having said frame connected therewith for operation of said valve, said valve including a case and a plunger, said dog being operatively connected with said plunger, a cylinder carried by said frame, a piston slidably engaging the cylinder, a single conduit extending from said cylinder to said case for conducting fluid from said valve to said cylinder, means connecting said piston with said crosshead for movement of said crosshead in response to movement of said piston, and means operatively connected to said crosshead and adapted to be attached to a swingable member pivoted on the frame for imparting swinging motion to the latter, and said guide having slots therein, guide pins in said crosshead and disposed in said slots, and a spring connecting the dog to the crosshead and reacting on said dog and said frame opposing the plunger responsive operation of said dog.

5. A power rake comprising a frame adapted to be secured to a tractor, a vertically swingable member mounted for pivotal movement on said frame, a pressure responsive valve having a plunger carried by said frame, means for conducting fluid under pressure to said valve and adapted to be fixed to a fluid pressure source of a tractor, a cylinder secured to said frame and having a piston therein, a single fluid passage extending from and connecting said cylinder to said valve for conducting fluid to said cylinder to operate said piston, means operatively connected with said piston and said member for transmitting movement of said piston to said member, and a resilient means connecting said piston to said member yieldingly urging the latter downwardly.

6. A power rake comprising a frame adapted to be secured to a tractor, a vertically swingable member mounted for pivotal movement on said frame, a pressure responsive valve having a plunger carried by said frame, means for conducting fluid under pressure to said valve and adapted to be fixed to a fluid pressure source of a tractor, a cylinder secured to said frame and having a piston therein, a single fluid passage extending from and connecting said cylinder to said valve for conducting fluid to said cylinder to operate said piston, means operatively connected with said piston and said member for transmitting movement of said piston to said member, means secured to said frame and operatively connected with said valve and said movement transmitting means for releasably locking said transmitting means, and means connecting the member to the piston and yieldingly urging the member downwardly to ground contacting position.

7. A power rake comprising a frame adapted to be secured to a tractor, a vertically swingable member mounted for pivotal movement on said frame, a pressure responsive valve having a plunger carried by said frame, means for conducting fluid under pressure to said valve and adapted to be fixed to a fluid pressure source of a tractor, a cylinder secured to said frame and having a piston therein, a single fluid passage extending from the cylinder and connecting said cylinder to said valve for conducting fluid to said cylinder to operate said piston, means operatively connected with said piston and said member for transmitting movement of said piston to said member, said valve having a plunger, means carried in part by said frame and responsive to movement of said plunger for releasably locking said transmitting means in selected positions, and a resilient means connecting said piston to said member yieldingly urging the latter downwardly.

8. A power rake comprising a frame adapted to be secured to a tractor, a vertically swingable member mounted for pivotal movement on said frame, a pressure responsive valve having a plunger carried by said frame, means for conducting fluid under pressure to said valve and adapted to be fixed to a fluid pressure source of a tractor, a cylinder secured to said frame and having a piston therein, a single fluid passage extending from and connecting said cylinder to said valve for conducting fluid to said cylinder to operate said piston, means operatively connected with said piston and said member for transmitting movement of said piston to said member, including a crosshead secured to said piston and a mechanical element secured to said member and said crosshead, and a resilient means connecting said piston to said member yieldingly urging the latter downwardly.

9. A power rake comprising a frame adapted to be secured to a tractor, a vertically swingable member mounted for pivotal movement on said frame and including tines, a pressure responsive valve having a plunger carried by said frame, means for conducting fluid under pressure to said valve and adapted to be fixed to a fluid pressure source of a tractor, a cylinder secured to said frame and having a piston therein, a single fluid passage extending from the cylinder and connecting said cylinder to said valve for conducting fluid to said cylinder to operate said member for transmitting movement of said piston to said member, including a crosshead secured to said piston and a mechanical element secured to said member and said crosshead, locking means in part secured to said frame and in part disposed on said crosshead for retaining said crosshead in a fixed position on said frame, and a resilient means connecting said piston to said member yieldingly urging the latter downwardly.

10. A power rake comprising a frame adapted to be secured to a tractor, a vertically swingable member mounted for pivotal movement on said frame, a pressure responsive valve having a plunger carried by said frame, means for conducting fluid under pressure to said valve and adapted to be fixed to a fluid pressure source of a tractor, a cylinder secured to said frame and having a piston therein, a single fluid passage extending from said cylinder and connecting said cylinder to said valve for conducting fluid to said cylinder to operate said member for transmitting movement of said piston to said member, a crosshead secured to said piston and a mechanical element secured to said member and said crosshead, locking means in part secured to said frame and in part disposed on said crosshead for retaining said crosshead in a fixed position on said frame, said locking means having a mechanical connection with said plunger to transmit movement of said plunger to said locking means for releasing said locking means in response to movement of said plunger caused by pressure applied in said valve, and an extensible linkage secured at one end to said crosshead for movement therewith and secured to said member at the opposite end thereof, and a spring constantly spreading said extensible member, the reaction of said spring being on said crosshead and said member thereby constantly urging said member when said crosshead is in a fixed position.

11. A rake comprising a frame, a tine assembly pivoted to said frame, a cylinder carried by said frame and having a piston therein, means secured to said piston and said assembly for operating said assembly in response to movement of said piston, a valve carried by said frame attached to a fluid pressure source, and means for conducting fluid from said valve to said cylinder to actuate said piston, means operatively connected with said piston and said valve for locking said piston in a selected position, said locking means being released upon operation of and by a part of said valve, a slidable connection between said assembly and said piston, and spring means acting on said connection and urging the tine assembly toward the ground.

HOWARD L. BERKLEY.

References Cited in the file of this patent

UNITED STATES PATENTS

| Number | Name | Date |
|---|---|---|
| 216,465 | Snowden | June 10, 1879 |
| 337,056 | Gibbins | Mar. 2, 1886 |
| 1,969,684 | Bird | Aug. 7, 1934 |
| 2,101,021 | Daly | Dec. 7, 1937 |
| 2,139,185 | Engel | Dec. 6, 1938 |
| 2,249,850 | Palmer | July 22, 1941 |
| 2,319,458 | Hornish | May 18, 1943 |
| 2,344,663 | Wood | Mar. 21, 1944 |
| 2,366,587 | Armington | Jan. 2, 1945 |
| 2,373,259 | Price | Apr. 10, 1945 |
| 2,388,411 | Hicks | Nov. 6, 1945 |
| 2,471,713 | Baker | May 31, 1949 |
| 2,526,028 | Johnson | Oct. 17, 1950 |
| 2,592,841 | Acton | Apr. 15, 1952 |

FOREIGN PATENTS

| Number | Country | Date |
|---|---|---|
| 384,715 | Germany | Nov. 5, 1923 |